UNITED STATES PATENT OFFICE.

CARL V. PETRAEUS, OF JOPLIN, MISSOURI, ASSIGNOR TO OLIVER H. PICHER, OF SAME PLACE.

METHOD OF EXTRACTING ZINC FROM COMPLEX ORES.

SPECIFICATION forming part of Letters Patent No. 547,587, dated October 8, 1895.

Application filed March 31, 1891. Serial No. 387,154. (No specimens.)

*To all whom it may concern:*

Be it known that I, CARL V. PETRAEUS, of the city of Joplin, county of Jasper, State of Missouri, have invented a certain new and useful Method of Extracting Zinc from Complex Ores, of which the following is a true and exact description.

My invention relates to the separation of zinc from complex ores containing it, my object being to at the same time effect the separation of the zinc from the other ingredients of the ore and obtain the zinc in proper condition for subsequent manufacture into spelter or white oxide. Natural ores are frequently found which consist of ores of zinc in admixture with ores of lead, iron, copper, &c. In some such ores it is practicable to effect the separation of the zinc by the use of jigs and concentrating-tables. Some ores, however, require very fine crushing in order to bring them to a condition in which separation can be effected by concentration, and in such cases not only are the losses heavy, but the separation is usually incomplete. Again, such ores generally contain precious metals present, as sulphides or chlorides, and these are to a large extent lost by the method of concentration. Besides the separation by concentration various other methods have been attempted and described for the separation of zinc from lead, iron, and silver; but in order to make the process commercially profitable and practicable it is necessary that the zinc should be obtained in such condition as will permit of its being readily converted into spelter or white oxide, and this requirement I have particularly in view in the process which I have invented. My process relates particularly to those complex ores which contain zinc in the form of a sulphide, and which, when the ore is crushed and subjected to an oxidizing roasting, changes into sulphate, sulphite, and oxide; and it consists in subjecting this roasted ore to the dissolving action of water acidified by the addition of sulphuric acid in order to extract any zinc which may be present in the form of oxide and to facilitate the extraction of the sulphate. I will here state, also, that having added the water and acid to the crushed ore I prefer to effect the thorough mixing of the ore and the solvent by the introduction of live steam to the mass, the consequent heating of the material under treatment also naturally facilitating the formation of the solution. After having dissolved out the soluble salts of zinc from the ore I next add to the solution a solution of calcium chloride in quantity sufficient to insure the desired reaction with the sulphate and sulphite of zinc in the solution. A double reaction ensues with the formation of a precipitate of calcium sulphate and a solution of chloride of zinc. I then separate the zinc chloride from the precipitate and add to the solution slaked lime until it becomes slightly alkaline. The result of this treatment is the formation of a precipitate of hydrated zinc oxide and a solution of chloride of calcium, and the zinc precipitate being separated from the solution will be found absolutely free of iron, copper, arsenic, antimony, &c., and in fit condition to produce an absolutely pure spelter or to be manufactured into a pure oxide by the Wetherill process or into an impure pigment by heating it to drive out combined water.

In the above description of my invention I have begun with a preliminary crushing and roasting. The crushing of the ore should be as fine as practicable, as the finer the ore is the more readily it is oxidized, and at the lower temperature, whereby a maximum of zinc sulphate is formed. If crushed and screened through a twenty to forty mesh screen, considerable ore-dust will fly up in the stack of the furnace, and care should be taken in condensing this dust. In roasting care should be taken not to raise the heat too high, so as to decompose sulphate of zinc formed, as the more of this present in the roasted ore the more economical the process is; also, the ore particles must not cinder together. Should this have been done either by carelessness or because the composition of the ore is such that it cannot be properly oxidized without cindering, then the roasted ore must be crushed. While or previous to leaching the mixed ores with water I prefer to add a small quantity of granulated lead or zinc, so as to prevent any silver or copper from entering the solution. The quantity of sulphuric acid which it is desirable to use depends upon the oxide of zinc present in the ore. This being determined by analysis, one hundred parts of $SO_3$ should be added to each one hundred parts of ZnO; and I may state that the spent acid from coal-oil refining is as well adapted for use in my process as any other acid. After stirring up the mass of solvent and ore by the introduction of steam, as already explained, I prefer to effect the separation of the solution from the insoluble matter holding the lead, copper, silver, gold, iron, and gangue matter in an exhaust-filter, using common ducking, matting, or similar material as the filtering medium. After taking off the solution the insoluble matter is ready for smelting. After adding the solution of calcium chloride to the solution of zinc sulphate and sulphite I have found it advisable to allow the solution to rest for about twenty-four hours, in order to effect a proper separation of the calcium sulphate, and after this filtering the zinc-chloride solution from the precipitates in an exhaust-filter or a filter-press, washing the precipitate thoroughly and saving the dilute solution for washing in the treatment of the next batch of material, thus saving valuable solution without an improper dilution of that part, which is used in the next treatment of the process. In stirring the slaked lime into the solution of zinc chloride I have found that the reaction is greatly accelerated by heat, though it will be understood that heat is not necessary.

The separation of the chloride of calcium solution of the hydrate oxide of zinc is conveniently carried on by filtration and washing in an exhaust-filter, and the chloride of calcium solution produced in this operation is then in practice used to mix with the solution of zinc sulphates, so that in a sense the chloride from calcium may be said to be used over and over again, and only a small supply in addition to that resulting from the method itself will be found necessary. Instead of calcium chloride barium or strontium chlorides may be used, they being the well-understood equivalents for the calcium chloride, and it will be understood that in referring to calcium chloride in the claim I do not mean to exclude these well-known equivalents.

Having now described my invention, what I claim as new, and desire to secure by Letters Patent, is—

The method of separating zinc from complex ores where it is found as a sulphate or sulphite which consists in crushing the ore, roasting it, dissolving out the soluble zinc salts in water, adding a solution of sulphuric acid to dissolve out any zinc oxide, introducing live steam to the mixture of ore and solvents to thoroughly mix and heat them, separating the solution of sulphate of zinc from the insoluble parts of the ore, adding chloride of calcium to the solution to convert the zinc into a chloride, separating the solution of zinc chloride from the precipitated calcium sulphate and finally adding quick lime to the solution of zinc chloride to precipitate the zinc as zinc oxide.

CARL V. PETRAEUS.

Witnesses:
   O. H. PICHER,
   W. H. PICHER.